US008662990B2

(12) United States Patent
Watkins et al.

(10) Patent No.: US 8,662,990 B2
(45) Date of Patent: Mar. 4, 2014

(54) METHOD AND SYSTEM FOR A PLAYER-SELECTABLE HIGH-DENOMINATION BONUS GAME

(75) Inventors: Brian A. Watkins, Austin, TX (US); Clint A. Owen, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 13/205,530

(22) Filed: Aug. 8, 2011

(65) Prior Publication Data

US 2012/0122543 A1 May 17, 2012

Related U.S. Application Data

(60) Provisional application No. 61/413,464, filed on Nov. 14, 2010.

(51) Int. Cl.
*A63F 13/00* (2006.01)

(52) U.S. Cl.
USPC .................... 463/20; 463/15; 463/16; 463/18

(58) Field of Classification Search
USPC .......................................... 463/15, 16, 18, 20
See application file for complete search history.

(56) References Cited

U.S. PATENT DOCUMENTS

| | | | | |
|---|---|---|---|---|
| 6,146,273 A * | 11/2000 | Olsen | 463/27 |
| 6,454,649 B1 | 9/2002 | Mattice et al. | |
| 6,860,810 B2 | 3/2005 | Cannon et al. | |
| 7,407,434 B2 * | 8/2008 | Thomas et al. | 463/13 |
| 2005/0096121 A1 | 5/2005 | Gilliland et al. | |
| 2008/0004101 A1 | 1/2008 | Hein et al. | |
| 2008/0009335 A1 | 1/2008 | Walker et al. | |
| 2008/0102923 A1 | 5/2008 | Esses et al. | |
| 2008/0146316 A1 | 6/2008 | Yoshizawa | |
| 2009/0005154 A1 | 1/2009 | Schultz | |
| 2009/0111565 A1 | 4/2009 | Suda | |
| 2009/0117970 A1 * | 5/2009 | De Waal et al. | 463/20 |
| 2010/0234095 A1 * | 9/2010 | Cole et al. | 463/20 |
| 2012/0028698 A1 * | 2/2012 | Walker et al. | 463/20 |
| 2012/0064961 A1 * | 3/2012 | Vancura | 463/20 |

* cited by examiner

*Primary Examiner* — Arthur O. Hall
*Assistant Examiner* — Shahid Kamal
(74) *Attorney, Agent, or Firm* — Nathan H. Calvert, Esq.; Russell D. Culbertson, Esq.; J P Cody, Esq.

(57) ABSTRACT

A primary game may display multiple bonus game selection symbols on a reel. The bonus game selection symbols allow the player to choose a bonus game. The bonus game simulates a play in an actual wagering game with a wager that would normally be higher than the wager in the primary game.

18 Claims, 10 Drawing Sheets

600

| BINGO PATTERN ID (601) | REEL STOP SET (602) | RESULT VALUE (603) | BONUS PLAY (604) | BONUS RESULT VALUE (605) |
|---|---|---|---|---|
| 0 | S1 | V0 | 1 | BV_0 |
| 1 | S2 | V1 | 1 | BV_1 |
| 2 | S3 | V2 | 1 | BV_2 |
| 3 | S4 | V3 | 1 | BV_3 |
| 4 | S5 | V4 | 1 | BV_4 |
| 5 | S6, S7 | V5 | 0 | BV_5 |
| 6 | S8, S9, S10 | V6 | 0 | BV_6 |
| 7 | OTHERS | V7 | 0 | BV_7 |

*Fig. 6*

700

| PRIZE LEVEL ID (701) | RESULT SYMBOL SET (702) | RESULT VALUE (703) |
|---|---|---|
| 0 | S1 | V0 |
| 1 | S2 | V1 |
| 2 | S3 | V2 |
| 3 | S4 | V3 |
| 4 | S5 | V4 |
| 5 | S6, S7 | V5 |
| 6 | S8, S9, S10 | V6 |
| 7 | OTHERS | V7 |

704

| BONUS LEVEL ID (705) | REEL STOP SET (706) | BONUS RESULT VALUE (707) |
|---|---|---|
| 0 | BGS1_1 | BV1_0 |
| 1 | BGS1_2 | BV1_1 |
| 2 | BGS1_3 | BV1_2 |
| 3 | BGS1_4 | BV1_3 |
| 4 | BGS1_5 | BV1_4 |
| 5 | BGS1_6, BGS1_7 | BV1_5 |
| 6 | BGS1_8, BGS1_9 | BV1_6 |
| 7 | BGS1_10, BGS1_11 | BV1_7 |
| 8 | BGS1_12, BGS1_13 | BV1_8 |
| 9 | OTHERS | BV1_9 |

708

| BONUS LEVEL ID (709) | REEL STOP SET (710) | BONUS RESULT VALUE (711) |
|---|---|---|
| 0 | BGS2_1 | BV2_0 |
| 1 | BGS2_2 | BV2_1 |
| 2 | BGS2_3 | BV2_2 |
| 3 | BGS2_4 | BV2_3 |
| 4 | BGS2_5 | BV2_4 |
| 5 | BGS2_6, BGS2_7 | BV2_5 |
| 6 | BGS2_8, BGS2_9 | BV2_6 |
| 7 | BGS2_10, BGS2_11 | BV2_7 |
| 8 | BGS2_12, BGS2_13 | BV2_8 |
| 9 | BGS2_14, BGS2_15 | BV2_9 |
| 10 | BGS2_16, BGS2_17 | BV2_10 |
| 11 | OTHERS | BV2_11 |

712

| BONUS LEVEL ID (713) | REEL STOP SET (714) | BONUS RESULT VALUE (715) |
|---|---|---|
| 0 | BGS3_1 | BV3_0 |
| 1 | BGS3_2 | BV3_1 |
| 2 | BGS3_3 | BV3_2 |
| 3 | BGS3_4 | BV3_3 |
| 4 | BGS3_5 | BV3_4 |
| 5 | BGS3_6, BGS3_7 | BV3_5 |
| 6 | BGS3_8, BGS3_9 | BV3_6 |
| 7 | BGS3_10, BGS3_11 | BV3_7 |
| 8 | BGS3_12, BGS3_13 | BV3_8 |
| 9 | BGS3_14, BGS3_15 | BV3_9 |
| 10 | BGS3_16, BGS3_17 | BV3_10 |
| 11 | BGS3_18, BGS3_19, BGS3_20 | BV3_11 |
| 12 | OTHERS | BV3_12 |

*Fig. 7*

METHOD AND SYSTEM FOR A PLAYER-SELECTABLE HIGH-DENOMINATION BONUS GAME

CROSS-REFERENCE TO RELATED APPLICATION

The Applicants claim the benefit, under 35 U.S.C. §119(e), of U.S. Provisional Patent Application No. 61/413,464 filed Nov. 14, 2010, and entitled "Method and System for a Player-Selectable High-Denomination Bonus Game." The entire content of this provisional application is incorporated herein by this reference.

TECHNICAL FIELD OF THE INVENTION

This invention relates to wagering games, and more specifically to gaming systems where the player can win a bonus round providing a simulated experience of a much higher value game.

BACKGROUND OF THE INVENTION

Slot machines in a casino are often divided into different areas based on the wager amounts required to play the games in each zone. For example, the slot machines requiring a one-dollar wager may be grouped into one area, and the slot machines requiring a ten-dollar wager may be grouped into a second area. Usually slot machines above a certain wager amount are provided in a "high-roller" area that may be cordoned or otherwise separated from the general casino floor so as to provide a different playing experience. Some players may routinely play in slot areas using credit denominations under one dollar, but the same players may be reluctant to play in the high roller area. This can be because of risk aversion, intimidation, unfamiliarity, or other factors.

Generally, casinos want to encourage players to play in the high-roller areas. Casino reel-based slot machines provide profit to a casino based largely on the amount of money that players wager on them. While slot machine payout amounts vary slightly, they are mostly grouped in a range above 95-98% of the total amount wagered on the slot machine. Therefore the "hold" amount, the approximately 2-5% or less that remains, provides a casino profit that is fairly constant among similar-type games at the same denomination. Increased profitability (and increased prize potential) are obtained by encouraging more "paylines" of wagering, or encouraging play in higher credit-value games like those found in the high roller areas.

One possible method for casinos to increase the amount of money wagered is to provide the option for a player to increase their wager amounts within a game. U.S. Publication No. 2009/0111565 by Suda discloses such an option. That application teaches a reel-type game that has a bonus trigger event. After the trigger event, the player can select a bonus game to play by choosing from several options presented on a separate bonus selection screen. Some of these games provide a chance to change the wager amount, which may provide a bonus-multiplier effect if the player achieves a winning result.

However, merely presenting the player with the option to alter a wager amount in a game would not necessarily persuade him to make a higher wager. If a player is accustomed to making relatively low wagers, they may be reluctant to increase their wager. As a result, the casino may profit less from providing a variable-wager game than it would from a higher-denomination game.

There is a need in a gaming industry, then, for other ways to actively encourage a player to play higher-denomination reel games.

SUMMARY OF THE INVENTION

The present invention satisfies this need by creating a simulated experience for a high-roller game as part of the play in a lower denomination slot game, yet without actually requiring a higher wager. The methods and systems herein provide a highly entertaining and original approach to a reel game including a primary reel game and a bonus games. The primary reel game may present the player with a choice of bonus games that simulate play in an actual game, the actual game normally requiring a higher wager than the primary game. In this manner, the current invention creates a promotional effect for higher-denomination games, encouraging players to later change machines and play those high-roller games.

A method for providing the game according to one embodiment includes receiving a game play request with an associated wager of a first credit denomination, at a gaming station. The method displays a matrix of symbol locations comprised of multiple reels. In a primary game, the method conducts a primary spin of the reels to produce a primary game spin result, the primary game spin result having the chance to include special reel symbols that activate a bonus game selection. In the event that a designated number of these bonus game selection symbols occur, the method prompts the player to choose a bonus game by selecting one of the bonus game selection symbols. The method receives the bonus game selection and conducts a bonus game corresponding to the bonus game selection. Preferably, the bonus game simulates a game that normally requires a much higher wager than the primary game. For example, the bonus game might be a different, higher-denomination game at the same gaming station, or may simulate an actual game available for play at a gaming station located elsewhere in the casino. The method produces a bonus game result for the bonus game and awards any prizes to the player.

The invention may also be embodied as a gaming system including a player interface. The player interface is adapted to receive a game play request with an associated wager of a first credit denomination. The gaming system also includes a display device adapted to display a matrix of symbol locations comprised of multiple reels. A game controller may control a primary spin of the reels to produce a primary game spin result, the primary game spin result having the chance to include bonus game selection symbols. In the event that multiple bonus game selection symbols occur, the game controller prompts the player to make a bonus game selection by selecting one of the bonus game selection symbols. The player interface is further adapted to receive the bonus game selection from the player. Upon receiving the bonus game selection, the game controller conducts a bonus game corresponding to the bonus game selection. In addition, the game controller produces a bonus game result for the bonus game and awards any prizes to the player.

Another version of the invention is a computer program stored on a computer readable medium. The software version is, of course, typically designed to be executed by a gaming machine or networked gaming system. The software includes multiple portions of computer executable code referred to as program code. The computer code includes player interface code for receiving a game play request with an associated wager of a first credit denomination. In the event that the display device is a video display device, the computer code also includes video display device code for displaying matrix of symbol locations comprised of multiple reels, each reel including one or more symbol locations. Game controller program code is provided for conducting a primary spin of the reels to produce a primary game spin result, the primary game spin result having the chance to include bonus game selection symbols. In the event that multiple bonus game selection symbols occur, the game controller program code prompts the player to choose a bonus game by selecting one of the bonus game selection symbols. The player interface program code is further adapted to receive the bonus game selection from the player. Upon receiving the bonus game selection, the game controller program code conducts a bonus game corresponding to the bonus game selection. In addition, the game controller program code produces a bonus game result for the bonus game and awards any prizes to the player.

Different features may be included in different versions of the invention. For example, different versions of the invention may vary in the manner in which they identify results for the primary and bonus games. Some variations predetermine the results associated with the primary and bonus games by using a bingo pattern. Other variations identify the results associated with the primary and bonus games after conducting corresponding "fair spins" of the reels, which may be a simulated fair spin based on one or more random numbers. Some versions of the invention differ in their use of the bonus game selection symbols. In some variations, the bonus game selection symbols may differ in appearance. In other variations, the bonus game selection symbols may be identical. The player may know what game they are choosing in their selection, or it may be a surprise until the bonus game starts. Preferably, there are three different bonus games available for selection, each providing a high-roller game, but with a different number of paylines. For example, one preferred version provides a I-line game, a 3-line game, and a 5-line game all in a simulated higher denomination amount. Preferably these high-roller bonus games show only the dollar amount, and not an amount in credits. But this is not limiting and a fully-simulated game including credits and currency amount may be used. In some forms of the invention, each bonus game selection symbol may correspond to a different bonus game presentation. In other forms of the invention, the bonus game symbols may all correspond to the same bonus game presentation. In addition, different versions of the invention may contain different features with regard to the bonus games. Some variations may feature bonus games that merely differ cosmetically from each other, with regard to symbol themes or background graphics, but still use similar paytables with corresponding symbols. Other variations may use different paytables for each game. Furthermore, the number of paylines used for the bonus games may vary. For example, one bonus game may award prizes based on one payline, while another bonus game may award prizes based on three paylines. The current invention provides a large amount of flexibility in the setup of the bonus games.

These and other advantages and features of the invention will be apparent from the following description of the illustrative embodiments, considered along with the accompanying drawings.

BRIEF DESCRIPTION OF THE DRAWINGS

FIG. 6 represents a paytable for a game according to one embodiment that uses bingo outcomes.

FIG. 7 represents a number of paytables for an embodiment that uses fair spins to produce the underlying game results.

DESCRIPTION OF ILLUSTRATIVE EMBODIMENTS

Figure 1:
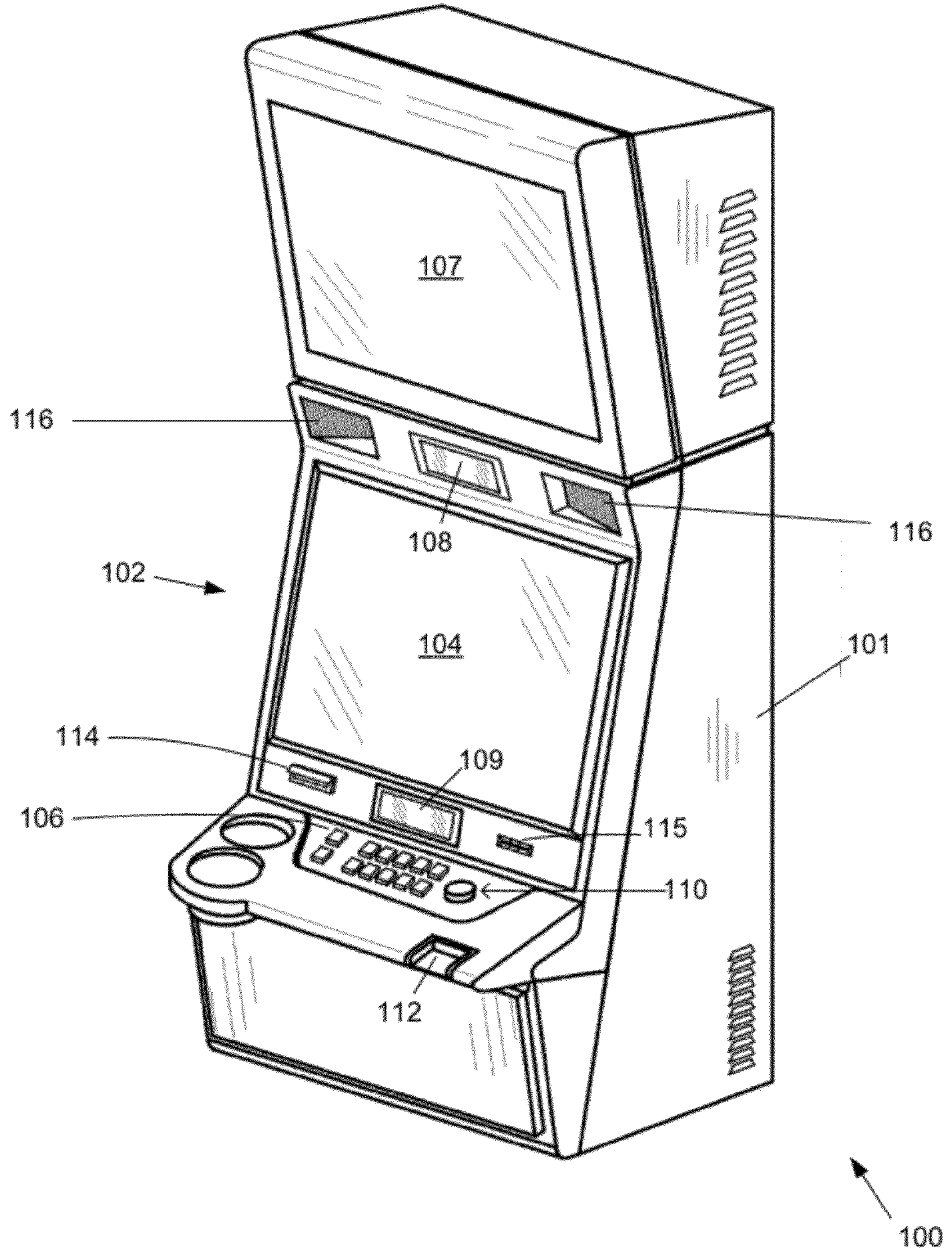
FIG. 1 is a front perspective view of a gaming machine which may be used in a gaming system embodying the principles of the present invention.
Figure 2:
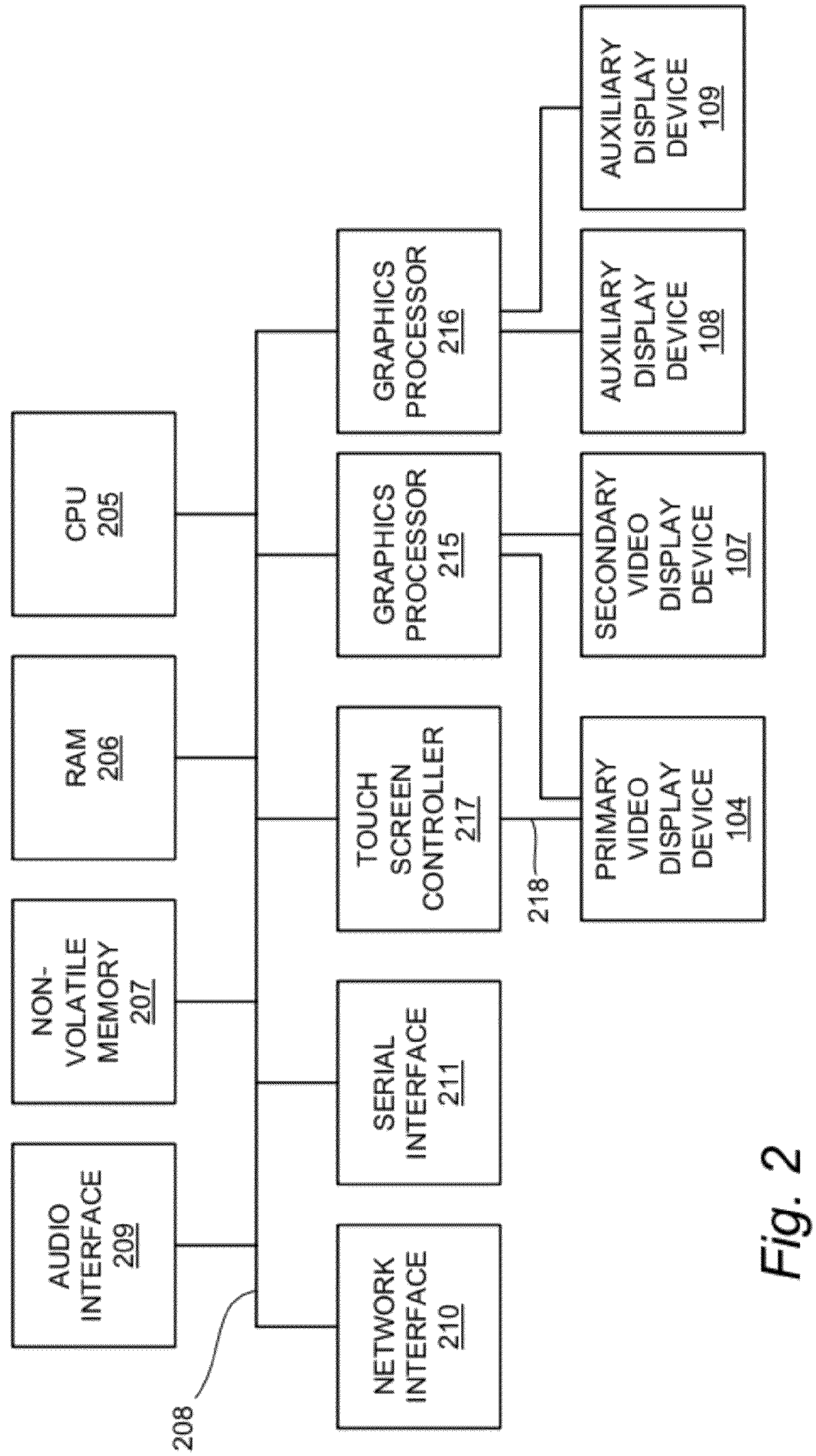
FIG. 2 is a block diagram showing various electronic components of the gaming machine shown in FIG. 1 together with additional gaming system components.

FIG. 1 shows a gaming machine 100 that may be used to implement a high-denomination bonus game according to the present invention. The block diagram of FIG. 2 shows further details of gaming machine 100. Referring to FIG. 1, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

Gaming machine 100, illustrated in FIG. 1, also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 shows that gaming machine 100 includes a central processing unit (CPU) 205 along with random access memory 206 and nonvolatile memory or storage device 207. All of these devices are connected on a system bus 208 with an audio interface device 209, a network interface 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display the high-denomination bonus game as described herein. CPU 205 also executes software related to communications handled through network interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network interface 210 provides an interface to other components of a gaming system in which gaming machine 100 is included.

It should be noted that the invention is not limited to gaming machines employing the personal computer-type arrangement of processing devices and interfaces shown in example gaming machine 100. Other gaming machines through which a high-denomination bonus game is implemented may include one or more special purpose processing devices to perform the various processing steps for implementing the present invention.

It should also be noted that the invention is not limited to gaming machines including only video display devices for conveying results. It is possible to implement a high-denomination bonus game within the scope of the present invention using an electro mechanical arrangement or even a purely mechanical arrangement for displaying the symbols needed to complete a high-denomination bonus game as described herein. However, some forms of the invention utilize one or more video display devices for displaying the spinning reels. For example, a gaming machine suitable for providing a high-denomination bonus game may include a mechanical reel-type display rather than a video-type display device for displaying results in a primary game, and include a video display device for presenting the high-denomination bonus game as a bonus game.

Figure 3:
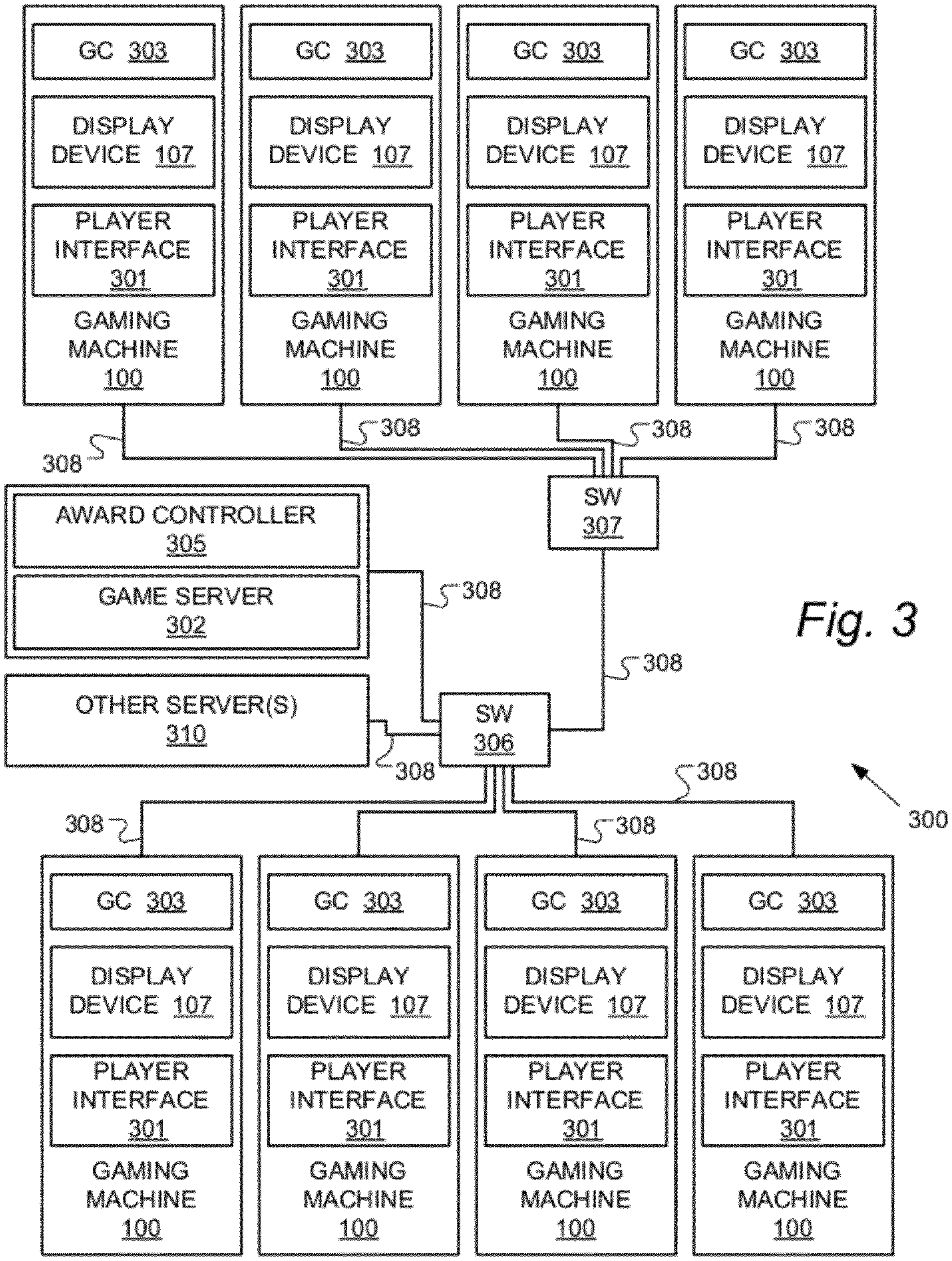
FIG. 3 is a system diagram of a gaming system according to one embodiment of the present invention.

Referring now to FIG. 3, a gaming system 300 according to the present invention includes a number of gaming machines, each comprising a gaming machine 100 in this example implementation. For purposes of describing system 300, each gaming machine 100 in FIG. 3 is shown as including a video display device 107 and a player interface that may include buttons, switches, or other physical controls and/or touch screen controls as discussed above in connection with FIG. 1. This player interface is labeled 301 in FIG. 3. System 300 further includes a game server 302 and a respective game client 303 (abbreviated "GC" in FIG. 3) included with each respective gaming machine 100. In the form of the invention shown in FIG. 3, these two components, game server 302 and the game client components 303 combine to implement a game control arrangement which will be described in detail below. System 300 also includes an award controller 305, which is shown in FIG. 3 as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 3.

Each gaming machine 100, and particularly player interface 301 associated with each gaming machine, allows a player to make any inputs that may be required to make the respective gaming machine eligible for a re-spin purchase game, and make selection of selectable objects displayed at the respective gaming machine in the course of a re-spin purchase game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a high-denomination bonus game at the respective gaming machine.

The game control arrangement made up of game server 302 and the respective game client 303 at a given gaming machine functions to control the respective video display device 107 for that gaming machine to display a high-denomination bonus graphic and a number of selectable objects. Award controller 305 is responsible for awarding prizes for a player's participation in a primary game or high-denomination bonus game. The network arrangement made up of network switches 306 and 307, and the various communication links 308 shown in FIG. 3 is illustrated merely as an example of a suitable communications arrangement. It should be noted that the game control arrangement, or as it is referred to generally the "game controller," may be implemented in some embodiments entirely on the gaming machine. The award controller 305 and game server 302 may also be embodied entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 3 shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, other server (s) 310 will be included in apparatus 300 for supporting these types of wagering and payout systems. As another example, the various gaming machines 100 included in system 300 may allow players to participate in a game (primary game) other than the game described herein, and such other game may rely on a result identified at or in cooperation with a device that is remote from the gaming machines. In this example, other server(s) 310 (that is, one or more server(s) 310) may be included in the system for identifying results for the primary game and communicating those results to the various gaming machines 100 as necessary. Generally, the other server(s) 310 shown in FIG. 3 are shown only to indicate that numerous other components may be included along with the elements that participate in providing re-spin purchase games according to the present invention. Other server(s) 310 may provide record keeping, player tracking, accounting, or result identifying services, or any other services that may be useful or necessary in a gaming system.

Figure 4:
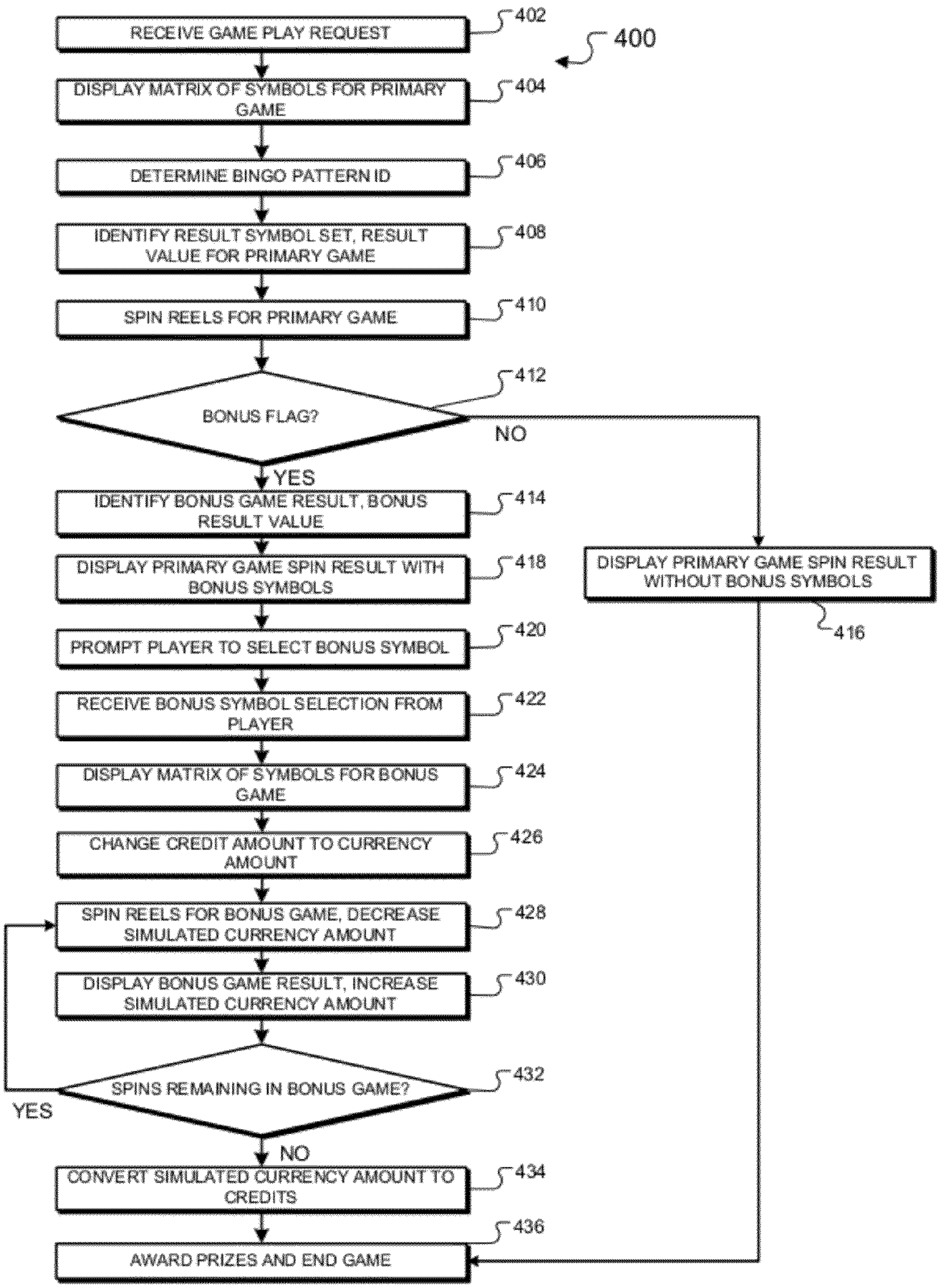
FIG. 4 is a flow chart of the game according to one embodiment that uses bingo game outcomes to produce the underlying game results.

FIG. 4 is a flow chart of one embodiment of the invention. The depicted process 400 illustrates the play of a primary game and a bonus game in a "bingo" embodiment, in which the outcomes of the primary game and bonus game are predetermined by a bingo pattern instead of being determined by the result of a "fair spin" of a reel. Preferably, the bonus game simulates the play of a game at another gaming station that would normally require a higher wager than the primary game.

The process begins with step 402, the receiving of a game play request with an associated wager at a gaming machine. Then, in step 404, the process displays a primary game presentation comprising a matrix of symbols and background graphics associated with the primary game. Then, in step 406, the process determines a bingo pattern identification (ID) number. The bingo pattern ID is a numerical index that corresponds to a daubed pattern on a representation of a bingo card, such as a "straight-line" or "four corners" pattern. The bingo pattern is determined by actual play in a networked bingo game, preferably between a group of participating gaming machines. As further explained in the subsequent description and in FIG. 6, the bingo pattern ID determined at step 406 will predetermine a primary game spin result and a primary result value. Also, the bingo pattern will determine whether to conduct a bonus game, and if a bonus game is conducted, the bingo pattern will predetermine a bonus game result and a bonus result value.

Based on the bingo pattern ID determined at step 406, the process at step 408 identifies a reel stop set, that is, a result symbol set and primary result value. The reel stop set represents a combination of reel symbols on a payline. For example, reel stop set "S3" might include a combination of three cherry symbols on a payline. A reel stop set may include more than one different pattern, but typically includes one winning pattern and many different reel position combinations that express that pattern. For example, a reel stop set may include 3 cherries on a payline, but it includes several different variations of that pattern, covering the different available paylines, and possibly the different alternative symbols that appear in symbol locations not part of the winning pattern. The primary result value is a numerical indicator that corresponds to a certain prize value. Typically, a relatively rare bingo pattern will correspond to a low bingo pattern ID number, which in turn will correspond to a relatively high-ranking reel stop set and a relatively high-ranking result value. In this way, a relatively rare bingo pattern will typically be mapped to a highly valuable award amount and a highly desirable combination of reel symbols. For example, a "blackout" bingo pattern might correspond to a bingo pattern ID of "0," award the highest possible prize value, and be displayed as a rare and high-ranking "7/7/7" reel combination.

Then, at step 410, the process begins a primary spin of the reels for the primary game, to display the result determined by the bingo game. In one or more preferred forms of the invention, the primary spin of the reels is conducted on a video display that displays a video representation of rotating slot reels. However, it is also possible for the primary spin of the reels to be conducted on mechanical reels in some forms of the invention.

At step 412, the process then determines whether a bonus flag is present, based on the bingo pattern ID determined at step 406. The bonus flag is a binary value associated with a bingo pattern. A value of "1" for the bonus flag indicates that a bonus flag is present, and thus a bonus game will be conducted. A value of "0" for the bonus flag indicates that no bonus flag is present, and that no bonus game will be conducted. If a bonus flag is present, the process will cause two or more bonus game selection symbols to appear at the time that the reels are stopped. Preferably, each bonus game selection symbol corresponds to a different bonus game presentation. However, in some forms of the invention, the bonus game selection symbols may all correspond to a single bonus game presentation. Typically, only relatively rare and high-ranking bingo patterns will be associated with a value of "1" for the bonus flag, and thus cause a bonus game to be conducted. However, in some versions of this embodiment, no bonus game may be conducted for rare and high-ranking bingo patterns, and a bonus game may be conducted for relatively common and low-ranking bingo patterns.

If step 412 determines that no bonus flag is present, then the process will proceed to step 416, displaying a primary game spin result that does not include two or more bonus game selection symbols. The process displays the primary game spin result by causing the spinning reels to come to a stop and displaying a new matrix of reel symbols. In this embodiment, the matrix of reel symbols includes the reel stop set determined at step 408. Because the reel stop set identified at step 408 corresponds to a bingo pattern ID determined in step 406, step 412 effectively displays a bingo pattern in reel format. The process will then skip to step 436, awarding any prize associated with the primary game, and then ending the game.

If step 412 determines that a bonus flag is present, the player will receive a fixed number of plays in the bonus game, the plays not requiring an additional wager of actual money from a player. The process at 414 identifies a bonus game result to be displayed later and a bonus result value corresponding to a prize amount for the bonus game. In this embodiment, the bonus game result and bonus result value identified at step 416 are predetermined by the bingo pattern ID determined at step 406. After verifying the presence of a bonus flag, the process stops the reels to display the primary game spin result, which includes the reel stop set determined at step 408, as well as two or more bonus game selection symbols in the matrix of symbols, indicating to a player that he has won a play in a bonus game (step 418). Then, the process at step 420 prompts the player to make a bonus game selection by selecting one of the two or more bonus game selection symbols. The prompt may include a visual or auditory message, and may further include additional graphic effects such as highlighting or enlarging the bonus game selection symbols that appear in the matrix.

At step 422, the process receives the bonus game selection from the player, and then at step 424, the process displays a bonus game presentation associated with the bonus game. The bonus game presentation comprises background graphics distinct from those displayed in a primary game. In one preferred form of the invention, the bonus game presentation and bonus game result are displayed in the format of a reel game. However, it is also possible that the bonus game presentation and bonus game result may be displayed in the format of a non-reel game, such as bingo or a card game. In the case that the bonus game presentation is displayed in the form of a reel game result, the bonus game presentation further comprises a matrix of bonus symbols. The matrix of bonus symbols is capable of displaying a bonus symbol set. Typically, the bonus symbol set includes symbols not featured in the primary game, although this is not required for the current invention. In some forms of the invention, the bonus symbol set may feature completely different symbols from the symbols featured in the primary game. Preferably, the bonus game presentation simulates an actual game at a different wagering machine that normally requires a higher wager to play.

In some forms of the invention, the bonus game presentation may completely displace the primary game presentation on a video display. In other forms of the invention, the primary game presentation may remain visible. For example, a first video display on the gaming station may show the primary game presentation, and a second video display on the gaming station may show the bonus game presentation.

In some versions of this embodiment, the bonus game selection may affect the bonus game presentation. In other versions of this embodiment, the bonus game selection may not affect the bonus game presentation. In other words, the player may be prompted to choose between two or more bonus game selection symbols, but regardless of which bonus game selection symbol the player chooses, the bonus game presentation will remain the same. In this embodiment, the bonus symbol selection does not affect the paytable of the bonus game.

Then, the process at step 426 converts a credit amount associated with the game to a simulated currency amount associated with the game, the simulated wager not requiring the player to insert additional money or credits into the gaming machine. Preferably, the simulated currency amount is prominently displayed during play of the bonus game, and can be increased or decreased as a simulated wager is made or a winning result is achieved in the bonus game. In this manner, the current invention generates excitement in the player by allowing him to experience the simulation of wagering and winning cash in a game of a different denomination from the primary game, as will be further explained below. If the bonus game is a higher-denomination game, the current invention advantageously creates a promotional effect for higher-denomination games. This encourages the player to place higher wagers in order to play the higher-denomination games, which results in greater casino revenue. In some forms of the invention, a first credit denomination wagered to play the primary game may be visible during play of the bonus game to comply with regulatory requirements. In other forms of the invention, the first credit denomination may be concealed to enhance the simulation of playing a game of a different denomination.

At step 428, the process spins the reels for the bonus game. This step may include requiring the player to place a simulated wager for the bonus game. Alternately, the gaming station may automatically make a simulated wager. Regardless of how the wager is made, the process decreases the simulated currency amount by the amount of the simulated wager. Step 428 further includes decrementing the number of remaining spins by one. Then, the process displays the bonus game result at step 430. The bonus game result in this embodiment is not determined from a random outcome of the reel spin. Rather, the bonus game result is predetermined at step 414, based on the bingo pattern ID determined at step 406. If the bonus result value corresponds to an award amount, the simulated currency amount is increased by the award amount.

Next, at step 432, the process determines whether any spins are remaining in the bonus game. If a spin in the bonus game remains, the process again conducts steps 428 through 432. If no spins in the bonus game remain, the process at 434 converts the simulated currency amount back to credits. Finally, the process at 436 awards any prizes and ends the game. In some embodiments of the invention, the process may award a single prize amount based on both the primary spin result and the bonus game result. In other embodiments, the process may award multiple prizes, one based on the primary spin result, and others based on the bonus game result.

Figure 5:
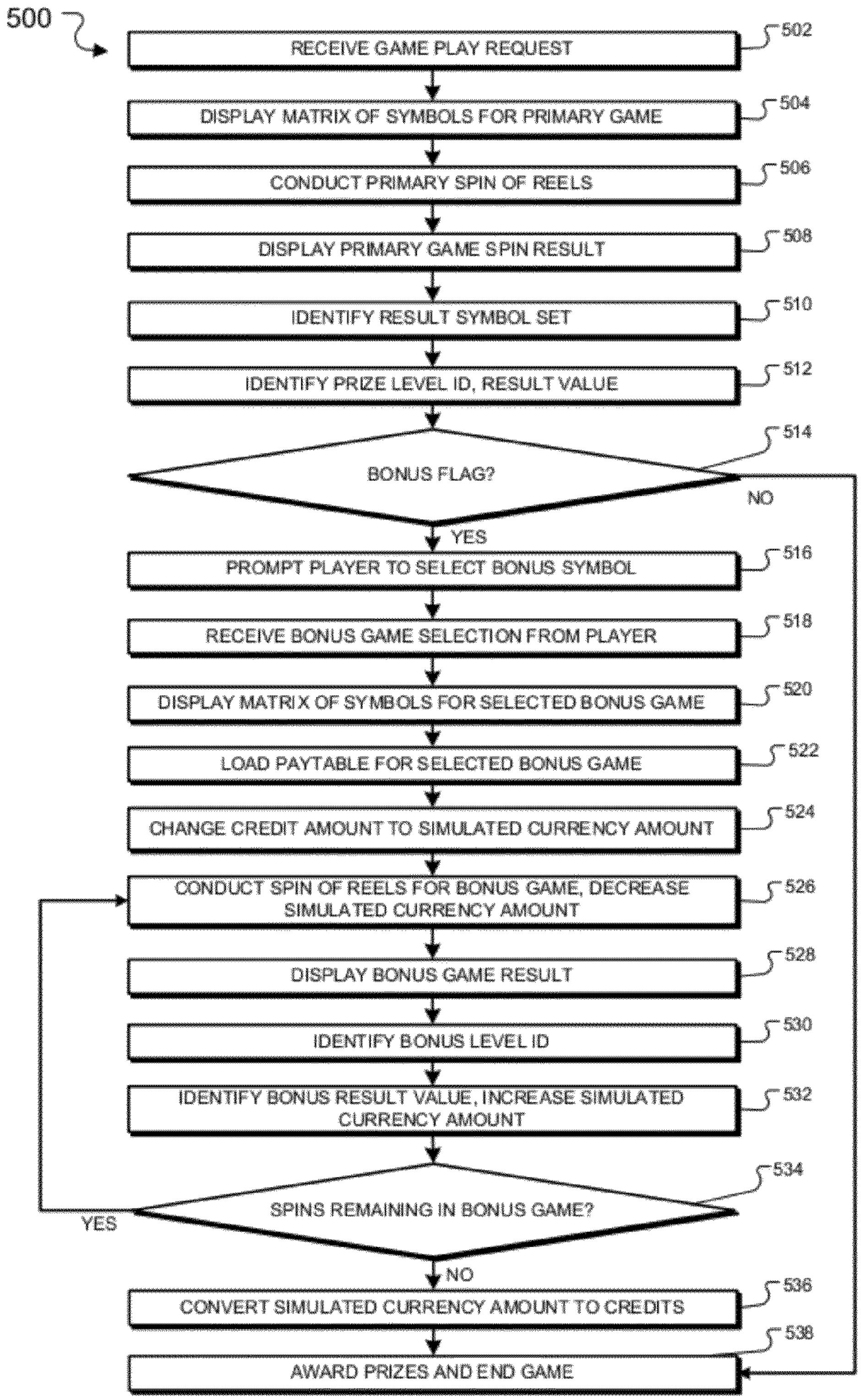
FIG. 5 is a flow chart of the game according to another embodiment that uses a fair-spin to produce the underlying game results.

FIG. 5 is a flow chart for another embodiment of the invention. The depicted process 500 illustrates the play of a primary and a bonus game in a "fair spin" embodiment, in which the outcome of the game is not predetermined before the reels are spun.

Process 500 begins with step 502, the receiving of a game play request with an associated wager at a gaming machine. Then, at step 504, the process displays a primary game presentation. The primary game presentation comprises a matrix of symbol locations and background graphics associated with the primary game. In this embodiment, the process then conducts a "fair spin" of the reels for the primary game at step 506. A "fair spin" is a spin of the reels for which the spin outcome is not predetermined before the spin is initiated, but is instead determined by a random generation method associated with the slot reels or a video representation of the slot reels. When the reels come to a stop, the process displays a primary game spin result at step 508, which it then uses to identify a reel stop set at step 510. The reel stop set represents a combination of reel symbols on a payline. As further illustrated in FIG. 7, each reel stop set corresponds to a prize level identification (ID) number and a result value, which the process identifies at step 512. The prize level ID is a numerical index that maps to one or more reel stop sets having a common result value. The result value is an alphanumeric index that corresponds to a certain prize value to be awarded to the player. Typically, a relatively rare reel stop set will indicate a prize level ID and a result value that correspond to a relatively high value prize. For example, a rare "7/7/7" reel combination might indicate a prize level ID and a result value that correspond to a jackpot value. However, it is not necessary for the present invention that rarer reel stop sets must correspond to higher value prizes.

At step 514, the process then determines whether a bonus flag is present. The bonus flag is preferably a binary value associated with a prize level ID. A value of "1" for the bonus flag indicates that a bonus flag is present, and thus a bonus game will be conducted. A value of "0" for the bonus flag indicates that no bonus flag is present, and that no bonus game will be conducted. Typically, only relatively rare and high-ranking bingo patterns will be associated with a value of "1" for the bonus flag, and thus cause a bonus game to be conducted. However, it is possible that no bonus game is conducted for rare and high-ranking bingo patterns, and that a bonus game is conducted for relatively common and low-ranking bingo patterns.

In this embodiment, the bonus flag may be determined by any of a number of methods. In one method, the process determines the presence of a bonus flag by scanning for bonus symbols scattered among the matrix of symbols displayed in the primary game spin result. If two or more bonus symbols are identified, a value of "1" for the bonus flag is returned. That is, if a bonus flag is present, then a bonus game will be conducted. If one or zero bonus symbols are identified, a value of "0" is returned for the bonus flag; no bonus flag is present, and no bonus game will be conducted. In an alternative method, the reel stop set identified in step 510 may determine the value of the bonus flag.

If step 514 determines that no bonus flag is present, then the process will skip to step 538, awarding any prize associated with the primary game, and then ending the game. If step 514 determines the presence of a bonus flag, the player will receive a fixed number of plays in the bonus game, the plays not requiring an additional wager of actual money from a player. In the case that a bonus flag is present, the process then continues to step 516, where it prompts the player to select one of the two or more identified bonus game selection symbols.

In this embodiment of the invention, the player's bonus symbol selection may affect the appearance of the bonus game presentation as well as the underlying game mechanics of the bonus game presentation. For example, one selectable bonus symbol might represent a bonus game presentation having a "fruit" reel theme, and another selectable bonus symbol might represent a bonus game presentation having an "outer space" reel theme. Furthermore, the paytables or paylines corresponding to each of the selectable bonus games may be different. For example, one selectable bonus game might award prizes based on five different paylines, whereas another selectable bonus game might award prizes based on three paylines.

At step 518, the process receives the bonus game selection from the player, and then at step 520, the process displays a bonus game presentation associated with the bonus game. The bonus game presentation comprises background graphics distinct from those displayed in a primary game. In one or more forms of the invention, the bonus game presentation and bonus game result are displayed in the format of a reel game. However, it is also possible that the bonus game presentation and result may be displayed in the format of a non-reel game, such as a card game. In the case that the bonus game presentation is displayed in the form of a reel game result, the bonus game presentation further comprises a matrix of bonus symbols. The matrix of bonus symbols is capable of displaying a bonus symbol set. Typically, the bonus symbol set features symbols not found in the primary game, although this is not required for the current invention. In some forms of the invention, the bonus symbol set may feature completely different symbols from the symbols featured in the primary game. Preferably, the bonus game presentation simulates an actual game at a different wagering machine that normally requires a higher wager to play.

In this embodiment of the invention, the process then loads the paytable for the selected bonus game at 522. Preferably, the paytables for each bonus game are different from one another. However, this is not required. Additional information about the structure of the paytables may be found in FIG. 7 and its corresponding description.

Next, the process at step 524 converts a credit amount associated with the game to a simulated currency amount associated with the game. Preferably, the simulated currency amount is prominently displayed during play of the bonus game, and can be increased or decreased as the player makes a simulated wager or achieves a winning result in the bonus game. In this manner, the current invention generates excitement in the player by allowing him to experience the simulation of wagering and winning cash in a game of a different denomination from the primary game, as will be further explained below. If the bonus game simulates a higher-denomination game, the current invention advantageously creates a promotional effect for higher-denomination games. This encourages the player to place higher wagers in order to play the higher-denomination games, which results in greater casino revenue. In some embodiments of the invention, a first credit denomination wagered to play the first game may be visible during play of the bonus game to comply with regulatory requirements. In other embodiments, the first credit denomination may remain concealed in order to enhance the simulation of playing a higher-denomination game.

At step 526, the process spins the reels for the bonus game. This step may include requiring the player to place a simulated wager for the bonus game, the simulated wager not requiring the player to insert additional money or credits into the machine. Alternatively, the process may place a simulated wager automatically. Regardless of how the simulated wager is placed, the simulated currency amount associated with the bonus game will decrease by the amount of the wager. Step 526 further includes decrementing the number of remaining spins by one. Next, the process displays the bonus game result at step 528 by bringing the spinning reels to a stop and displaying a matrix of bonus symbols. In this embodiment, the bonus game result is derived from a fair spin of the reels; it is not predetermined. Then, at step 530, the process uses the bonus game result to identify a bonus level identification (ID) number for the bonus game symbol set. The bonus level ID is a numerical index that maps to one or more bonus reel stop sets having a common bonus result value. The bonus result value is an alphanumeric index that corresponds to a certain bonus prize value to be awarded to the player. At step 532, the process uses the bonus level ID determined at step 530 to identify the bonus result value. If the bonus result value corresponds to an award amount, the simulated currency amount is increased by the award amount.

The process then proceeds to step 534, where it determines whether any spins are remaining in the bonus game. If one or more spins are remaining, the process conducts steps 526 through 534 again. If no more spins are remaining, the process then proceeds to step 536, where it converts the simulated currency amount for the bonus game into a credit amount. Finally, the process at step 538 awards any prizes associated with the result value for the primary game and the bonus result values. In some versions of this embodiment, the process may award a single prize amount equaling a sum of the prizes associated with the primary spin result and the bonus game results. In other embodiments, the process may award multiple prizes: one based on the primary spin result, and the others based on the bonus game results.

FIG. 6 represents an example paytable for a "bingo" embodiment of the invention. The example paytable in FIG. 6 includes eight bingo pattern ID levels, levels 0 through 7 in first column 601 labeled "Bingo Pattern ID." Each bingo pattern ID correlates to one or more reel stop sets indicated in the second column 602, one result value indicated in the third column 603, one bonus play value indicated in the fourth column 604, and one bonus result value indicated in column 605. In the example paytable shown in FIG. 6, reel stop sets are represented by the labels S1 through S10, result values are represented by the labels V0 through V7, bonus play values are represented by a binary number, and bonus result values are represented by BV_0 through BV_8.

The paytables in the invention are not limited to any particular number of bingo pattern IDs or any particular number of corresponding reel stop sets, result values, bonus play values, or bonus result values. Furthermore, the number of reel stop sets that may correspond to any given bingo pattern ID is not limited.

In one form of operation according to the invention, a game controller either located at the bingo player station (such as bingo player station 100 shown in FIGS. 1 and 2) or located at a local area server or central server (such as servers 200 and 201, respectively, in FIG. 2), determines a bingo pattern and matches it to a corresponding bingo pattern ID. For example, a "straight-line" bingo pattern may correspond to a bingo pattern ID of 3, and a "kite" bingo pattern may correspond to a bingo pattern ID of 2. The game controller applies the bingo pattern ID to assign corresponding values for the reel stop set, result value, bonus play, and bonus result value. In this manner, the bingo pattern ID determines before completing the primary reel spin whether a bonus game is conducted, the symbols to be displayed for the primary and bonus game spins, and the prize values to be awarded for the primary game and the bonus game. If a bonus game is to be conducted, the game controller then conducts the bonus game, for example, in the manner described with regard to FIG. 4. To provide the player with the feel of playing a "fair spin" game in which a reel spin determines the outcome, the primary game spin result, bonus game result, and the prize values to be awarded for the primary and secondary games are not revealed until after their corresponding reel spins.

FIG. 7 shows several example paytables for a "fair-spin" embodiment of the invention. The example paytables in FIG. 7 include table 700, a paytable for a primary game according to the invention, and tables 705, 706, 709, which are paytables for the bonus game.

Table 700 includes eight prize level identification (ID) numbers, numbers 0 through 7 in column 701. Each prize level ID correlates to one or more reel stop sets indicated in column 702, and to one result value indicated in column 703. In table 700, reel stop sets are represented by the labels S1 through S10, and result values are indicated by the labels V0 through V7.

Tables 704, 708, and 712 preferably include differing numbers of bonus level identification (ID) numbers. Each of tables 704, 708, and 712 includes different bonus game symbol sets and bonus result values. For each of tables 704, 708, and 712, each bonus level ID maps to one or more bonus game symbol sets and one bonus result value corresponding to that table.

Returning to FIG. 5, step 522, the process replaces primary paytable 700 by loading one of bonus paytables 704, 708, and 712, depending on which bonus symbol the player picks. Based on the bonus reel combination returned in the reel spin, the selected paytable is then used to determine a bonus level ID and bonus result value, as shown in step 530 and 532. Upon ending the game at step 538, the bonus paytable is replaced by loading primary paytable 700.

This embodiment of the invention provides a large amount of flexibility regarding the structure and use of the bonus game paytables. Each of the bonus game paytables may have a different number of bonus level IDs or different bonus game symbol sets. Among different paytables, it is further possible to map different bonus result values to the same bonus level ID. For example, bonus result level 2 in table 712 corresponds to a bonus result value of BV3_2, which could represent a $500 award. However, in table 708, bonus result level 2 corresponds to a bonus result value of BV2_2, which could represent a $300 award, for example. In addition, it is possible to assign each bonus paytable to a game that awards prizes based on different numbers of paylines. For example, tables 704, 708, and 712 might correspond to five-payline, three-payline, and one-payline games, respectively. This provides great flexibility in the manner in which bonus prizes may be awarded.

However, in other versions, the bonus paytables may have a highly parallel structure in which the number of bonus level IDs and bonus result values are the same, and only the bonus game symbol sets differ. By keeping the paytables constant except for the bonus symbol sets, it is possible for the current invention to feature bonus games having differently-themed symbol sets, while still maintaining the same underlying game mechanics among bonus games.

Figure 8:
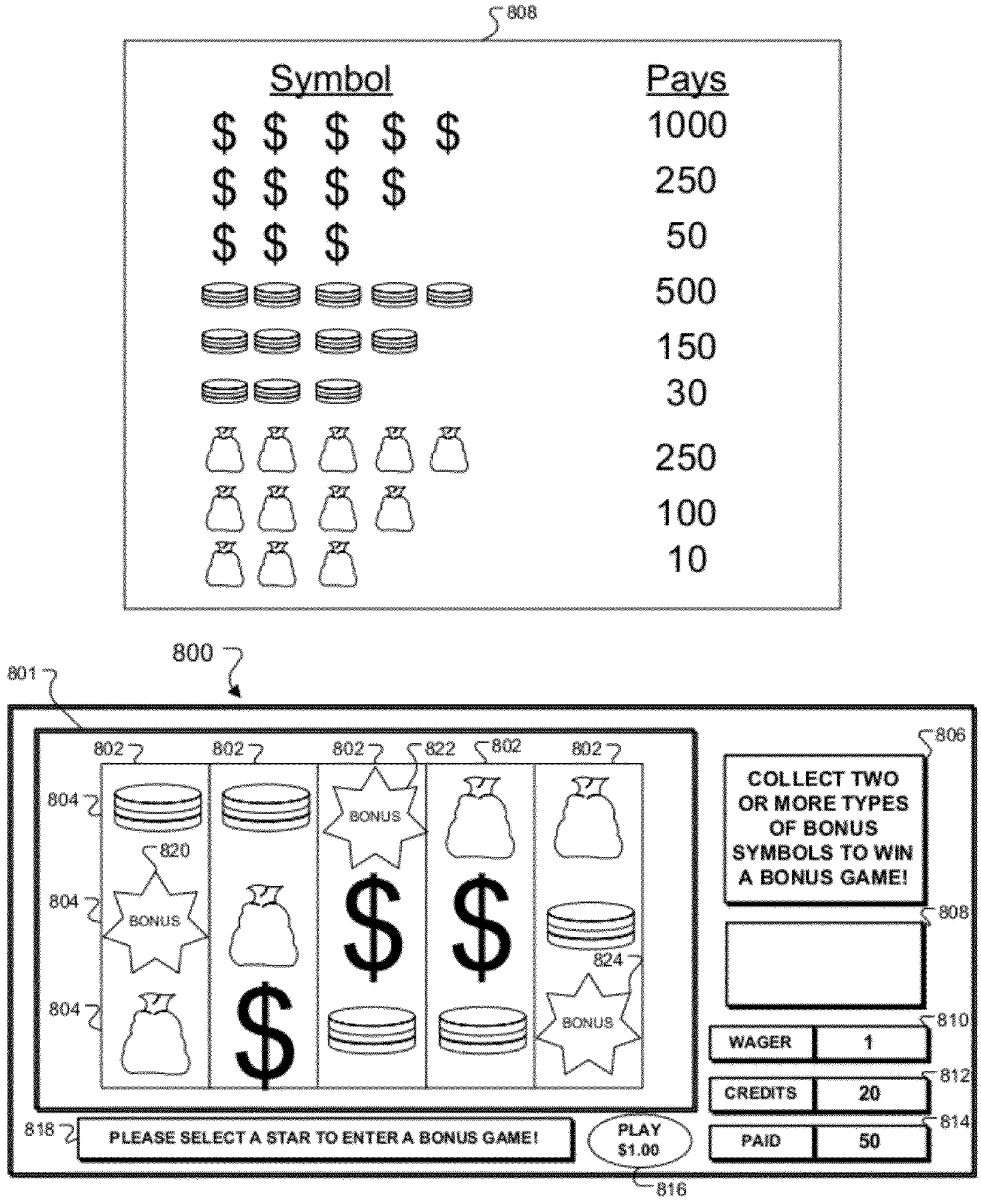
FIG. 8 is a diagram of a bonus game selection screen in the primary game.

FIG. 8 depicts a bonus game selection screen inside of a primary game according to one embodiment of the invention. The primary game display 800 comprises background graphics and a matrix of symbol locations 801. The matrix of symbol locations is arranged in rows and columns to represent simulated slot machine reels. Components 802 represent the simulated reels, while symbols are designated 804. In this instance there are five reels, but the game can be played with more and less reels. There are also three symbols per reel. On the right in box 806 are the instructions for playing the game. Underneath the instructions, in box 808, are the prizes that can be won as well as the requirements for winning them. An enlarged view of box 808 is also shown to include additional detail. Under box 808 is box 810, which displays credits wagered most recently. Under box 810 is box 812, which displays any credits in the players account. Under box 812 is box 814, which displays the player's most recent winning credit value. To the left of box 814 in component 816, is the first credit denomination that the player must pay to play the base game. In the bottom left-hand corner there is a message line 818, where the game station can display further instructions to the player.

The symbols 804 include bonus selection symbols 820, 822, and 824. In FIG. 8, the primary game spin result has displayed two or more different bonus game selection symbols, and thus a bonus game will be conducted. Bonus game selection symbols 820, 822, and 824 may be identical in appearance, as shown, or they may visibly differ from each other. However, regardless of whether the bonus symbols appear the same, they each correspond to different bonus game presentations. The game station prompts the player to make a bonus game selection by displaying a message in the message line 818. In some forms of the invention, the bonus game selection symbols may be highlighted, or the prompt may include additional visual or auditory effects, such as a flashing screen or noise. Using the player interface, the player will select one of the bonus game selection symbols to cause a bonus game presentation to be displayed. The bonus game presentations simulate actual games that would normally require a higher wager than the primary game.

Figure 9:
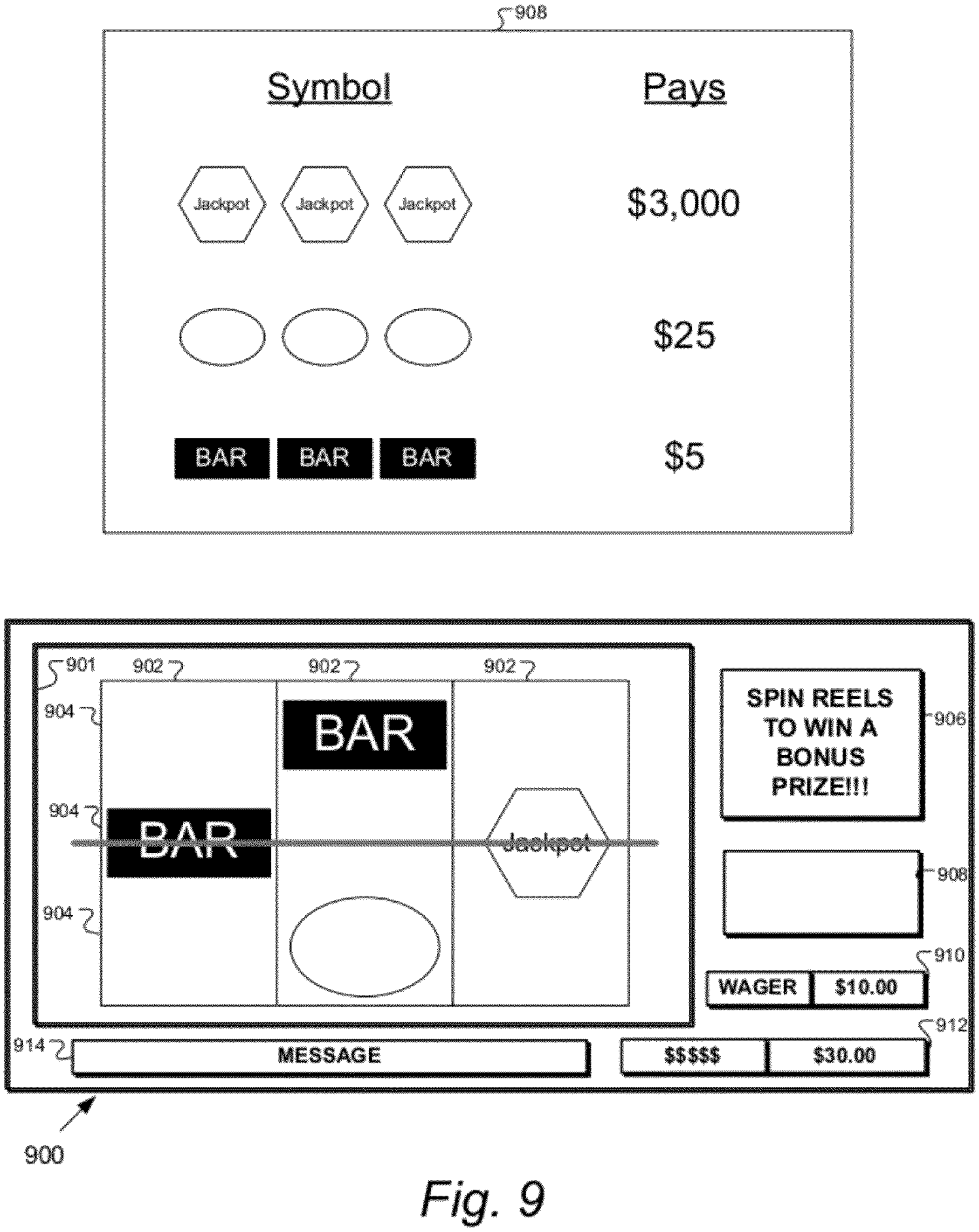
FIG. 9 is a diagram of a bonus game screen according to one embodiment.

FIG. 9 depicts a bonus game presentation according to one embodiment of the invention. In this embodiment, the first credit denomination is concealed from the player in order to enhance the simulation of playing an actual higher denomination game. Preferably, the bonus game presentation is very similar or identical to an actual wagering game on a different gaming station, the actual wagering game normally requiring a higher wager than that required to play the primary game. By displaying a bonus game presentation corresponding to an actual high-denomination game on a different gaming station, the current invention creates a promotional effect not only for higher-denomination games in general, but for a particular game within the same casino. This promotional effect greatly increases the chances that a player will wager higher amounts and thus increase casino revenue.

A bonus game display 900 comprises background graphics and a matrix of symbol locations 901. The matrix of symbol locations is arranged in rows and columns to represent simulated slot machine reels. Other embodiments may, of course, use other types of game displays to accumulate symbols according to the methods herein. Components 902 represent the simulated reels, while symbols are designated 904. In this instance there are three reels, but the game can be played with more or fewer reels. There are also three symbols per reel. The symbols 904 that may be displayed include bonus symbols that are not featured in the primary game. On the right in box 906 are the instructions for playing the game. Underneath the instructions in box 908, are the prizes that can be won as well as the requirements for winning them. An enlarged view of box 908 is shown below primary to show additional detail. Because the simulated wager associated with the bonus game is higher than that associated with the primary game, the jackpot amount in box 908 is correspondingly higher than in box 808. Under box 908 is box 910, which displays the simulated wager associated with the bonus game. Beneath box 910 is box 912, which prominently displays a simulated currency amount that decreases when a simulated wager is made, and increases when a winning bonus game result is achieved. The simulated currency amount provides additional player excitement and helps further the promotional effect of playing the actual higher-denomination game. Notice that in this embodiment, the bonus round uses a simulated currency $1 currency value, displayed with a dollar sign in the wager and credit lines, and in the prize table. This is contrasted with the primary game screen shown in FIG. 8 which uses denominations of credits (whatever credit value is used in that game), but may not actually show credit amounts. The labeled dollar values in the depicted bonus game display 900 therefore represent simulated wager amounts providing the simulated experience of a higher value game. When all the spins in the bonus game are depleted, the simulated currency amount is converted to a credit amount and awarded to the player. Message line 914 may provide additional instructions to the player.

Figure 10:
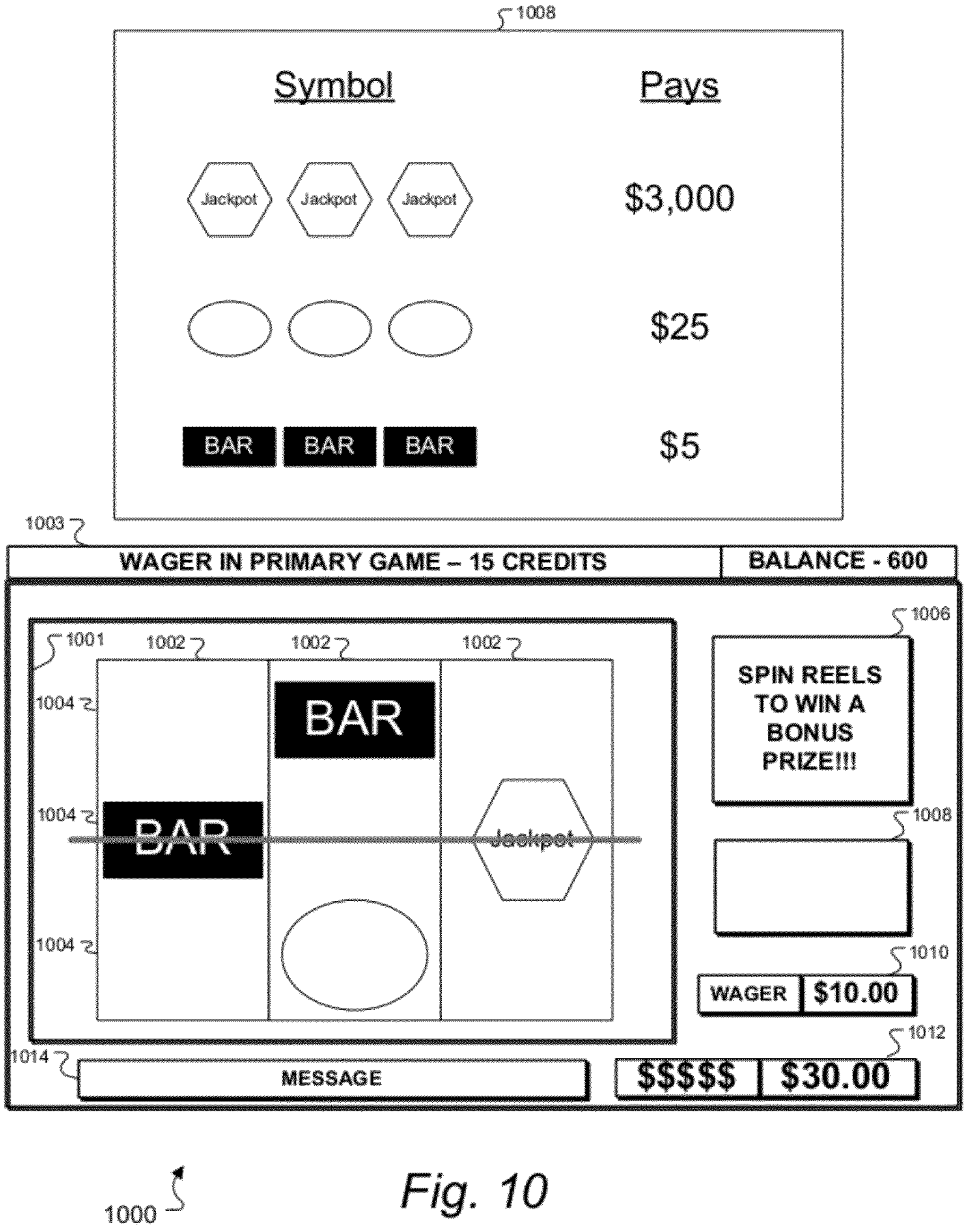
FIG. 10 is a diagram of a bonus game screen according to another embodiment.

FIG. 10 depicts a bonus game presentation 1000 according to an alternate embodiment of the invention. In this embodiment, the player's base game credit count and base game wager remain visible on the screen at base game credit indicator box 1003, which is preferably shown with a different color scheme or other visual indication that it is not a part of the bonus game being conducted in the remainder of bonus game display 1000. This feature may be implemented in jurisdictions that require the actual amount wagered to remain visible at all times. In some versions using a base game credit indicator, a prize awarded in the bonus game will cause an increase in both the simulated credit value 1012, and the actual player credit balance shown in credit indicator box 1003. Some versions may conduct the bonus round with a simulated credit amount (box 1012) reflecting the actual value of the player's base game credit balance, while other versions may provide a simulated credit balance that is higher. For example, if the base game were a 5-cent game, the displayed balance in box 1003 of 600 credits would match the simulated balance of $30 shown in the simulated currency box 1012. Other versions may provide a much higher simulated balance to play in the simulated high roller game. For example, 10 times or 100 times the player's actual credit value. In such embodiments, the amount won in the simulated bonus game round can be converted back to base game credits and awarded after each bonus spin, or after the entire bonus round is conducted. For example, if a high roller bonus round contained five spins in which the first spin won $5 and fourth spin won $10, the respective prizes in the 5-cent base game of 100 credits and 200 credits might be added to the balance in box 1003 immediately after the first and fourth spins, or might be accumulated and awarded at once after all five spins. Of course, other base game credit denominations and simulated denominations may be used, typically with a bonus round using a simulated denomination much higher than the credit value of the base game. For example, the bonus round is preferably intended to simulate "high-roller" slot machines with credit values of $1, $3, $5, $10, or higher.

The depicted bonus game display 1000 comprises background graphics and a matrix of symbol locations 1001. The matrix of symbol locations is arranged in rows and columns to represent simulated slot machine reels. Other embodiments may, of course, use other types of game displays to accumulate symbols according to the methods herein. Components 1002 represent the simulated reels, while symbols are designated 1004. In this instance there are three reels, but the game can be played with more or fewer reels. There are also three symbols per reel. The symbols 1004 that may be displayed include bonus symbols that are not featured in the primary game. On the right in box 1006 are the instructions for playing the game. Underneath the instructions in box 1008, are the prizes that can be won as well as the requirements for winning them. An enlarged view of box 1008 is shown beneath bonus game display 1000 to provide additional detail. Under box 1008 is box 1010, which displays the simulated wager associated with the bonus game. Beneath box 1010 is box 1012, which prominently displays a simulated currency amount that decreases when a simulated wager is made, and increases when a winning bonus game result is achieved. The simulated currency amount provides additional player excitement and helps further the promotional effect of playing the actual higher-denomination game. When all the spins in the bonus game are depleted, the simulated currency amount is converted to a credit amount and awarded to the player. Message line 1014 may provide additional instructions to the player.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The features herein may be used in any functional sub-combination. The description should be interpreted as providing support for each functional sub-combination of features. For example, this application supports all sub-combinations of features as if all of the claims were written in multiple dependent form as is common in European practice.

The above described embodiments are intended to illustrate the principles of the invention, but not to limit the scope of the invention. Various other embodiments and modifications to these preferred embodiments may be made by those skilled in the art without departing from the scope of the present invention.

For example, although the above disclosure includes specific examples of a bingo-driven embodiment and a "fair spin" embodiment, the invention is not limited to these examples for generating results. Other result generating systems within the scope of the present invention include selecting lottery ticket records from an electronic lottery record set or using a random number generator or other technique to select a result according to a desired result probability.

The invention claimed is:

1. A method of providing a wagering game, the method comprising:

(a) through a gaming machine, receiving a game play request for a primary game with an associated wager of a first credit denomination;

(b) displaying a matrix of symbol locations comprised of multiple reels, each including one or more symbol locations;

(c) in the primary game, conducting a primary spin of the reels and producing a primary game spin result, the primary game spin result having a chance to include an outcome activating a number of plays in a respective bonus game, each bonus game not operating at the first credit denomination and not requiring an additional wager from a player;

(d) in the event that the primary game spin result includes the outcome activating a number of plays in a respective bonus game, prompting the player to make a bonus game activation;

(e) receiving the bonus game activation from the player;

(f) conducting a selected bonus game corresponding to the bonus game activation, the bonus game providing a simulation of a game that would normally require a higher wager than the primary game, but instead simulates wagering a value much higher than the first credit denomination wagering in the primary game, the simulation being conducted by:

(i) displaying by the claming machine, a simulated currency amount, with a much higher currency value than a currency value of an actual credit amount stored for the player;

(ii) decreasing the simulated currency amount when a simulated wager is made;

(iii) increasing the simulated currency amount when a bonus game result is a winning result; and (iv) converting by the claming machine, the simulated currency amount to a credit amount in the first credit denomination having a lower actual value than the displayed simulated currency amount; and (g) producing the bonus game result for the selected bonus game.

2. The method of claim 1, wherein the bonus game result includes multiple spins, each made without an additional wager, the multiple spins producing a simulated experience of playing the game that would normally require a higher wager than the primary game multiple times.

3. The method of claim 1, wherein conducting the bonus game further includes displaying a player credit balance and a simulated denomination balance at different locations simultaneously.

4. The method of claim 3, wherein each bonus game features at least one additional symbol not featured in the primary game.

5. The method of claim 3, further including a number of bonus symbol sets, each bonus symbol set corresponding to a different bonus game, and each bonus symbol set consisting of symbols not featured in the primary game.

6. The method of claim 3, wherein the primary game spin result is identified from the primary spin of the reels, and the bonus game result is identified from a secondary spin of the reels.

7. The method of claim 1, wherein the first credit denomination is hidden during the activated bonus game in order to better simulate the game that would normally require a higher wager.

8. The method of claim 1, wherein the activated bonus game completely displaces the primary game on a gaming display.

9. The method of claim 1, further including awarding a first prize based on the primary game spin result and a second prize based on the bonus game result.

10. A system for providing a wagering game, the system comprising:

(a) a player interface adapted for receiving a game play request for a primary game with an associated wager of a first credit denomination, at a gaming machine;

(b) a video display device adapted for displaying a matrix of symbol locations comprised of multiple reels, each including one or more symbol locations;

(c) a game controller adapted for conducting a primary spin of the reels in the primary game and producing a primary game spin result, the primary game spin result having a chance to include an outcome activating a number of plays in a respective bonus game, each bonus game not operating at the first credit denomination and not requiring an additional wager from a player;

(d) the game controller further adapted for prompting the player, in the event that the spin result includes the outcome activating a number of plays in a respective bonus game, to make a bonus game activation;

(e) the player interface further adapted for receiving the bonus game activation from the player;

(f) the game controller further adapted for conducting a selected bonus game corresponding to the bonus game activation, the bonus game simulating a game that would normally require a higher wager than the primary game, but instead simulates wagering a value much higher than the first credit denomination wagering in the primary game, the simulation being conducted by:

(i) displaying a simulated currency amount, with a much higher currency value than a currency value of an actual credit amount stored for the player;

(ii) decreasing the simulated currency amount when a simulated wager is made;

(iii) increasing the simulated currency amount when a bonus game result is a winning result; and (iv) converting the simulated currency amount to a credit amount in the first credit denomination having a lower actual value than the displayed simulated currency amount.

11. The system of claim 10, wherein the bonus game result includes multiple spins, each made without an additional wager, the multiple spins producing a simulated experience of playing the higher value game multiple times.

12. The system of claim 10, wherein the game controller is further adapted to display, while conducting the bonus game, both a player credit balance and a simulated denomination balance at different locations simultaneously.

13. The system of claim 10, wherein each bonus game features at least one additional symbol not featured in the primary game.

14. The system of claim 10, wherein the primary game spin result is identified from the primary spin of the reels, and the bonus game result is identified from a secondary spin of the reels.

15. The system of claim 10, wherein the first credit denomination is hidden during the activated bonus game in order to better simulate the game that would normally require a higher wager.

16. The system of claim 10, wherein the activated bonus game completely displaces the primary game on a gaming display.

17. The system of claim 10, further including awarding a single prize based on the primary game spin result and the bonus game result.

18. The system of claim 10, further including awarding a first prize based on the primary game spin result and a second prize based on the bonus game result.

* * * * *